United States Patent
Ito

(10) Patent No.: US 8,722,315 B2
(45) Date of Patent: May 13, 2014

(54) OPTICAL DISC AND ULTRAVIOLET-CURABLE COMPOSITION FOR OPTICAL DISC

(75) Inventor: Daisuke Ito, Ageo (JP)

(73) Assignee: DIC Corporation, Tokyo (JP)

( * ) Notice: Subject to any disclaimer, the term of this patent is extended or adjusted under 35 U.S.C. 154(b) by 958 days.

(21) Appl. No.: 12/301,513

(22) PCT Filed: May 18, 2007

(86) PCT No.: PCT/JP2007/060259
§ 371 (c)(1),
(2), (4) Date: Jan. 9, 2009

(87) PCT Pub. No.: WO2007/136003
PCT Pub. Date: Nov. 29, 2007

(65) Prior Publication Data
US 2009/0207723 A1 Aug. 20, 2009

(30) Foreign Application Priority Data

May 24, 2006 (JP) ................................. 2006-144042

(51) Int. Cl.
*G11B 7/254* (2013.01)
*C08F 290/06* (2006.01)
*C08G 59/20* (2006.01)
*G11B 7/257* (2013.01)
*C08G 59/62* (2006.01)
*C09D 163/10* (2006.01)

(52) U.S. Cl.
CPC .............. *G11B 7/254* (2013.01); *C08F 290/06* (2013.01); *C08G 59/20* (2013.01); *G11B 7/257* (2013.01); *C08G 59/62* (2013.01); *C09D 163/10* (2013.01)
USPC ........................... 430/321; 428/64.6; 369/283

(58) Field of Classification Search
None
See application file for complete search history.

(56) References Cited

U.S. PATENT DOCUMENTS

| | | | | |
|---|---|---|---|---|
| 3,884,702 A | * | 5/1975 | Koshimo et al. | 430/283.1 |
| 5,256,446 A | * | 10/1993 | Bogen | 427/163.4 |
| 7,014,988 B2 | | 3/2006 | DeVoe et al. | |
| 2007/0036935 A1 | * | 2/2007 | Fujii et al. | 428/64.4 |
| 2010/0278031 A1 | * | 11/2010 | Yamaguchi et al. | 369/283 |
| 2012/0060175 A1 | * | 3/2012 | Oshio et al. | 720/718 |
| 2012/0099412 A1 | * | 4/2012 | Oshio et al. | 369/100 |

FOREIGN PATENT DOCUMENTS

| | | |
|---|---|---|
| EP | 1 669 989 A1 | 6/2006 |
| JP | 11-191240 A | 7/1999 |
| JP | 2002-92948 A | 3/2002 |
| JP | 2003-105230 A | 4/2003 |
| JP | 2003-119231 A | 4/2003 |
| JP | 2003-206449 A | 7/2003 |
| JP | 2003-212956 A | 7/2003 |
| JP | 2005-048095 * | 2/2005 |
| JP | 2006-066044 * | 3/2006 |
| JP | 2006-139819 * | 6/2006 |
| TW | 200517464 A | 6/2005 |
| WO | 2005/031729 A1 | 4/2005 |

OTHER PUBLICATIONS

Machine translation of JP 2003-105230, 7 pages (2003).*
Machine translation of JP 2003-212956 9 pages (2003).*
Nikkei Electronics (Nikkei Business Publications, Inc.), Aug. 9, 1999, pp. 47 to 54.
An Office Action, mailed Nov. 12, 2012, which issued during the prosecution of Taiwanese Application No. 096118092.

* cited by examiner

*Primary Examiner* — Martin Angebranndt
(74) *Attorney, Agent, or Firm* — McDermott Will & Emery LLP

(57) ABSTRACT

An optical disc of the present invention includes at least a light reflection layer and a light transmission layer formed on a substrate, wherein recording and reading are performed by a laser beam through the light transmission layer, the light transmission layer is formed from a cured film of a ultraviolet-curable composition containing an epoxy acrylate resin obtained by reacting a half ester compound (A), which is obtained from a lactone-adduct of a hydroxyalkyl (meth) acrylate (a1) and a dibasic acid anhydride (a2), and an epoxy resin (B), and the film thickness of the light transmission layer is from 50 to 150 μm.

14 Claims, No Drawings

OPTICAL DISC AND ULTRAVIOLET-CURABLE COMPOSITION FOR OPTICAL DISC

CROSS REFERENCE TO RELATED APPLICATIONS

This is a U.S. national phase application under 35 U.S.C. §371 of International Patent Application No. PCT/JP2007/060259, filed May 18, 2007 and claims the benefit of Japanese Application 2006-144042, filed May 24, 2006. The International Application was published Nov. 29, 2007 as International Publication No. WO 2007/136003 under PCT Article 21(2) the contents of which are incorporated herein in their entirety.

TECHNICAL FIELD

The present invention relates to an optical disc in which at least a light reflection layer and a light transmission layer are formed on a substrate, and recording and reading are performed by a laser beam through the light transmission layer. The present invention relates particularly to an optical disc for which recording and reading are performed by a semiconductor laser having an emission wavelength within a range from 370 to 430 nm (hereafter referred to as a "blue laser").

BACKGROUND ART

In recent years, developments in information technology have enabled the transmission of large quantities of recorded information. This has lead to demands for high-density, large-capacity optical discs that are capable of recording and reading large video or music files, or computer data or the like.

The DVD (Digital Versatile Disc), which is in widespread use as a high-density recording medium, has a structure in which two substrates of thickness 0.6 mm are bonded together using an adhesive. In order to enable higher density recording, the DVD uses a 650 nm laser that is of a shorter wavelength than that used for a CD (Compact Disc), and the optical system also has a higher numerical aperture.

However, in order to enable the recording and reading of high-definition video such as that associated with HDTV (High Definition Television), further increases in recording density are required. Investigations are already being conducted into methods of achieving even higher density recording, and into the optical discs required for such recording, which will act as the next generation of discs following DVD. High-density recording systems using novel optical disc structures that utilize a blue laser with an even shorter wavelength than that used for DVD and a high numerical aperture optical system have already been proposed (for example, Nikkei Electronics (Nikkei Business Publications, Inc.), 1999, Aug. 9, pp. 47 to 53.).

These new optical discs have a structure in which a recording layer is formed on top of a transparent or opaque substrate formed from a plastic such as a polycarbonate, and a light transmission layer of approximately 100 Mm is then created on top of the recording layer, wherein the recording light or reading light, or both types of light, are irradiated through the light transmission layer. For reasons of productivity, research of the light transmission layer of this type of optical disc has focused almost exclusively on the use of ultraviolet-curable compositions.

As an example of this type of optical disc in which recording or reading is performed using a blue laser, an optical disc has been proposed in which an information recording layer and a light reflection layer are formed on top of a circular substrate, and an ultraviolet-curable resin is then applied and cured to create a light transmission layer to the top of the disc. In this technique, a cationic polymerization-type ultraviolet-curable composition is used as the material for forming the light transmission layer (for example, see Japanese Unexamined Patent Application, First Publication No. Hei 11-191240 and Japanese Unexamined Patent Application, First Publication No. 2002-92948). However, cationic polymerization-type ultraviolet-curable compositions generate Lewis acids upon ultraviolet radiation that can cause corrosion of the light reflection layer, meaning achieving favorable stability for the optical disc upon long-term storage can be problematic. The material used for the light reflection layer requires a high reflectance at approximately 400 nm, and therefore silver or an alloy containing silver as the main component is typically used. Because silver and alloys containing silver as the main component are prone to chemical changes such as corrosion under the action of chemical agents, in those cases where silver or an alloy containing silver as the main component is used as the material for forming the light reflection layer, the use of a cationic polymerization-type ultraviolet-curable composition as the material for forming the light transmission layer that contacts the light reflection layer is undesirable.

An optical disc has also been proposed which, instead of using a cationic polymerization-type ultraviolet-curable composition, uses a typical radical polymerization system composed of an ultraviolet-curable composition containing a (meth)acrylate compound and a photopolymerization initiator as the main components (see Japanese Unexamined Patent Application, First Publication No. 2003-119231). This document discloses a radiation-curable composition with a low curing shrinkage ratio, low water absorption and excellent transparency, which contains urethane (meth)acrylate and tris(2-acryloyloxyethyl) isocyanurate, and is applicable to an optical disc in which recording or reading is performed using a blue laser. However, when this composition is used in an optical disc that uses silver or a silver alloy as the light reflection layer, corrosion tends to develop upon long-term storage under high temperature and high humidity conditions, and exposure to fluorescent light tends to cause a deterioration in the optical disc reflectance.

Although not proposed for a blue laser optical disc, another example of an ultraviolet-curable composition that has been proposed for use in a bonded optical disc is an ultraviolet-curable composition for bonding an optical disc that includes a reaction product between a half-ester compound, which is itself a reaction product of a (meth)acrylate containing one hydroxyl group within each molecule and a dibasic acid anhydride, and an epoxy resin having at least two epoxy groups within each molecule, as well as a reactive diluent and a photopolymerization initiator (see Japanese Unexamined Patent Application, First Publication No. 2003-206449 ("JP '449:)). This technique has an object of providing an adhesive composition that exhibits superior durability (reliability) when used in a bonded optical disc that contains a semi-transparent reflection layer formed from silver or the like, and the document reports that no change is observed in the external appearance of the reflection layer even after standing under high temperature and high humidity conditions. However, this technique does not relate to blue laser optical discs, but rather relates to bonded discs such as a DVD-9 disc.

Ultraviolet compositions suffer from a problem in that the shrinkage that occurs upon curing tends to cause warping of the substrate, but in a DVD structure in which the two substrates are bonded together using an adhesive layer formed from an ultraviolet-curable composition, the strain generated during curing of the ultraviolet-curable composition is suppressed by the rigidity of the substrates positioned on either side of the adhesive layer. In contrast, in a blue laser optical disc, although a substrate having a thick structure is formed on one surface of the light transmission layer, the other surface does not have a rigid substrate created thereto, and usually has only a comparatively thin layer such as a surface coating layer formed thereon. Furthermore, whereas the adhesive layer within a DVD has a thickness of approximately 50 µm, the light transmission layer of a blue laser optical disc is formed with an even greater thickness of approximately 100 µm. Accordingly, if an ultraviolet-curable composition used as an adhesive layer for a DVD is simply transferred to use within a blue laser optical disc, then a large degree of warping results.

Furthermore, in conventional CD and DVD discs, reading and writing of information is performed by transmission of light through a protective coating layer and an adhesive layer used for bonding, both of which are formed from ultraviolet-curable compositions. Because these layers composed of cured films of ultraviolet-curable compositions represent a thickness of only approximately 7 µm in a CD and approximately 50 µm in a DVD, even if some warping occurs, it has little adverse effect on the reading or writing of information. However, if these compositions are used for the light transmission layer of a blue laser optical disc, then because of the relatively thick film thickness, even comparatively small warping can cause read errors, and in the worst case scenario, may make reading impossible. As a result, in those cases where an ultraviolet-curable composition is used for the light transmission layer of a blue laser optical disc, warping tends to be a significant problem.

When an ultraviolet-curable composition containing the reaction product of 2-acryloyloxyethyl phthalate and a bisphenol A epoxy resin, which represents one of the examples disclosed in Patent Document 4, was used to form a light transmission layer within an actual blue laser optical disc, the warping was significant, and of a level that could not be ignored.

SUMMARY OF INVENTION

The present invention takes the above circumstances into consideration, with an object of providing an optical disc in which recording and reading are performed by a laser beam through a light transmission layer, wherein warping of the disc is suppressed to an absolute minimum, and the optical disc also exhibits excellent durability and light fastness. Another object of the present invention is to provide an ultraviolet-curable composition that is useful as the light transmission layer of this optical disc. A particular object of the present invention is to provide an optical disc in which recording or reading is performed using a blue laser light, and which is able to address the problems outlined above.

The inventors of the present invention investigated oligomers having a molecular structure that was capable of alleviating the type of strain generated upon curing, and discovered that an ultraviolet-curable composition containing an epoxy acrylate resin obtained by reacting a half ester compound, which is obtained from a lactone-adduct of a hydroxyalkyl (meth)acrylate and a dibasic acid anhydride, and an epoxy resin exhibited the required characteristics, and that an optical disc including a light transmission layer formed from this ultraviolet-curable composition exhibited particularly favorable properties with reduced warping.

In other words, the present invention provides:
an optical disc including at least a light reflection layer and a light transmission layer formed on a substrate, in which recording and reading are performed by a laser beam through the light transmission layer, wherein
the light transmission layer is formed from a cured film of an ultraviolet-curable composition containing an epoxy acrylate resin obtained by reacting a half ester compound (A), which is obtained from a lactone-adduct of a hydroxyalkyl (meth)acrylate (a1) and a dibasic acid anhydride (a2), and an epoxy resin (B), and the film thickness of the light transmission layer is from 50 to 150 µm.

Furthermore, the present invention also provides an ultraviolet-curable resin composition for an optical disc containing an epoxy acrylate resin obtained by reacting a half ester compound (A), which is obtained from a lactone-adduct of a hydroxyalkyl (meth)acrylate (a1) and a dibasic acid anhydride (a2), and an epoxy resin (B).

The epoxy acrylate resin used in the ultraviolet-curable composition for an optical disc according to the present invention is able to suppress the elastic modulus of the cured film of the composition to a low value, and is therefore capable of alleviating the stress that occurs within the cured film upon curing. As a result, an optical disc with minimal warping can be obtained. Further, the epoxy acrylate resin used in the present invention has a rigid cyclic structure and is also composed of an ester structure that exhibits excellent heat resistance. This means that when the composition is used for the light transmission layer within an optical disc having a silver or silver alloy reflection layer, excellent levels of durability and light fastness can be achieved. Accordingly, an optical disc of the present invention is ideal for a blue laser optical disc having a thick light transmission layer.

DETAILED DESCRIPTION OF THE INVENTION

An ultraviolet-curable composition for an optical disc according to the present invention contains an epoxy acrylate resin obtained by reacting a half ester compound (A), which is obtained from a lactone-adduct of a hydroxyalkyl (meth) acrylate (a1) and a dibasic acid anhydride (a2), and an epoxy resin (B).

In this description, "(meth)acrylic acid" refers to either acrylic acid or methacrylic acid. The same type of definition also applies to acrylic acid or methacrylic acid derivatives.

The epoxy acrylate resin is preferably produced by the reaction process described below.

In the first stage of the reaction process, the hydroxyl group of the lactone-adduct of a hydroxyalkyl (meth)acrylate (a1) and the dibasic acid anhydride (a2) are reacted using a molar ratio between the hydroxyl group of (a1) and the dibasic acid anhydride (a2) of 0.9 to 1.1, and preferably an equimolar ratio, thereby forming the half ester compound (A).

In the second stage of the reaction process, the obtained half ester compound (A) and the epoxy resin (B) are reacted using a molar ratio between the carboxyl group of the half ester compound (A) and the glycidyl groups of the epoxy resin of 0.9 to 1.1, and preferably an equimolar ratio.

The first stage reaction is preferably conducted in the presence of an inhibitor at a reaction temperature of 60 to 120° C., and more preferably 70 to 100° C. At temperatures less than 60° C. the reaction becomes overly long, whereas at temperatures exceeding 120° C., polymerization of the unsaturated double bond within the lactone-adduct of the hydroxyalkyl (meth)acrylate (a1) is more likely to occur. In the second stage reaction, the reaction time becomes overly long at temperatures less than 60° C., whereas polymerization of the unsaturated double bond within the lactone-adduct of the hydroxyalkyl (meth)acrylate (a1) tends to occur at temperatures exceeding 120° C., and therefore the second stage reaction is also preferably conducted in the presence of an inhibitor at a reaction temperature of 60 to 120° C., and more preferably 70 to 100° C. Conventional catalysts may be used as the glycidyl group ring-opening catalyst. Representative examples of such catalysts include tertiary amines such as triethylenediamine or tri-n-butylamine, as well as triphenyl phosphite, phosphite esters, and phosphines such as triphenylphosphine.

The lactone-adduct of a hydroxyalkyl (meth)acrylate (a1) is obtained by a ring-opening addition of a lactone to a hydroxyalkyl (meth)acrylate. Examples of the hydroxyalkyl (meth)acrylate include 2-hydroxyethyl (meth)acrylate, 2-hydroxypropyl (meth)acrylate and 4-hydroxybutyl (meth)acrylate. Examples of the lactone include β-propiolactone, β-butyrolactone, γ-butyrolactone, γ-valerolactone, δ-valerolactone, β-methyl-δ-valerolactone, γ-caprolactone, and ∈-caprolactone.

Of the various possibilities, a compound obtained by adding 2 to 10 mols of ∈-caprolactone to 1 mol of 2-hydroxyethyl acrylate is preferred, and a compound obtained by adding 2 to 5 mols of ∈-caprolactone to 1 mol of 2-hydroxyethyl acrylate is particularly desirable.

Examples of the dibasic acid anhydride (a2) include phthalic anhydride, 1,2,3,6-tetrahydrophthalic anhydride and derivatives thereof, 3,4,5,6-tetrahydrophthalic anhydride and derivatives thereof, 1,2,3,4-tetrahydrophthalic anhydride and derivatives thereof, 2,3,4,5-tetrahydrophthalic anhydride and derivatives thereof, hexahydrophthalic anhydride and derivatives thereof, succinic anhydride and derivatives thereof, monoalkylsuccinic anhydrides and derivatives thereof, dialkylsuccinic anhydrides and derivatives thereof, maleic anhydride and derivatives thereof, monoalkylmaleic anhydrides and derivatives thereof, and dialkylmaleic anhydrides and derivatives thereof. Of these, the use of phthalic anhydride, a tetrahydrophthalic anhydride or hexahydrophthalic anhydride is preferred.

There are no particular restrictions on the structure of the epoxy resin (B), and examples include bisphenol epoxy resins, novolak epoxy resins, alicyclic epoxy resins, glycidyl esters, glycidyl amines, heterocyclic epoxy resins and brominated epoxy resins.

Examples of the above bisphenol epoxy resins include bisphenol A epoxy resin, a lactone-modified epoxy resin in which ∈-caprolactone has been added to the secondary hydroxyl group of bisphenol A epoxy resin, bisphenol F epoxy resin, and bisphenol S epoxy resin; examples of the above novolak epoxy resins include phenol novolak epoxy resin, cresol novolak epoxy resin, bisphenol A novolak epoxy resin, and dicyclopentadiene novolak epoxy resin; examples of the above alicyclic epoxy resins include 3,4-epoxy-6-methylcyclohexylmethyl-3,4-epoxy-6-methylcyclohexane carboxylate, 3,4-epoxycyclohexylmethyl-3,4-epoxycyclohexane carboxylate, and 1-epoxyethyl-3,4-epoxycyclohexane; examples of the above glycidyl esters include diglycidyl phthalate, diglycidyl tetrahydrophthalate, and dimer acid diglycidyl ester; examples of the above glycidyl amines include tetraglycidyldiaminodiphenylmethane, triglycidyl-p-aminophenol, and N,N-diglycidylaniline; and examples of the above heterocyclic epoxy resins include 1,3-diglycidyl-5,5-dimethylhydantoin and triglycidyl isocyanurate.

Of these, bisphenol epoxy resins have an excellent cost-performance ratio, and in particular, bisphenol A epoxy resin exhibits superior performance such as adhesive strength and durability, as well as superior cost, and is therefore preferred.

The weight average molecular weight (Mw) of the epoxy acrylate resin measured by gel permeation chromatography (GPC) is preferably within a range from 900 to 8,000. Further, the ratio between the weight average molecular weight (Mw) and the number average molecular weight (Mn) (namely, Mw/Mn) is preferably from 1.3 to 2.8, and more preferably from 1.4 to 2.0.

By including the above epoxy acrylate resin, the ultraviolet-curable composition for an optical disc according to the present invention is able to suppress the elastic modulus of the cured film to a low level, and can therefore alleviate the type of strain that is generated within the cured film upon curing, meaning an optical disc with minimal warping can be obtained. Further, because the epoxy acrylate resin has a rigid cyclic structure and is composed of an ester structure that exhibits excellent heat resistance, when the composition is used for the light transmission layer within an optical disc having a silver or silver alloy reflection layer, excellent levels of durability and light fastness can be achieved.

By ensuring that the viscosity at 25° C. of the ultraviolet-curable composition for an optical disc according to the present invention is from 500 to 3,000 mPa·s, and preferably from 500 to 2,500 mPa·s, a uniform film can be formed even when the thickness of the light transmission layer is approximately 100 μm.

The ultraviolet-curable composition of the present invention is preferably prepared so that the elastic modulus of the cured film obtained following irradiation with ultraviolet light is from 100 to 2,000 MPa (25° C.). A composition that yields a value of 200 to 1,500 MPa is particularly preferred. Provided the composition yields an elastic modulus within this range, the stress during curing can be readily alleviated, and an optical disc can be obtained that exhibits minimal change in warping even upon exposure to high temperature and high humidity conditions over a long period.

In the ultraviolet-curable composition for an optical disc according to the present invention, the quantity of the epoxy acrylate resin obtained by reacting the half ester compound (A), which is obtained from the lactone-adduct of a hydroxyalkyl (meth)acrylate (a1) and the dibasic acid anhydride (a2), and the epoxy resin (B), relative to the total weight of the ultraviolet-curable composition is preferably within a range from 10 to 80% by weight, and more preferably from 20 to 70% by weight.

A composition that is liquid at room temperature to 40° C. is preferred as the ultraviolet-curable composition for an optical disc of the present invention, as such a composition facilitates film formation using a spin coater or the like. Further, a solvent is preferably not used, and even if used, is preferably restricted to a minimal quantity.

The ultraviolet-curable composition of the present invention may use conventional radical polymerizable monomers, oligomers, photopolymerization initiators, and thermal polymerization initiators and the like.

As the radical polymerizable monomer, any monomer that is capable of undergoing a radical polymerization can be used without any particular restrictions. Examples of monofunctional (meth)acrylates include ethyl (meth)acrylate, butyl (meth)acrylate, 2-ethylhexyl (meth)acrylate, nonyl (meth)acrylate, tridecyl (meth)acrylate, hexadecyl (meth)acrylate, octadecyl (meth)acrylate, isoamyl (meth)acrylate, isodecyl (meth)acrylate, isostearyl (meth)acrylate, cyclohexyl (meth)acrylate, benzyl (meth)acrylate, 2-hydroxyethyl (meth)acrylate, 3-chloro-2-hydroxypropyl (meth)acrylate, methoxyethyl (meth)acrylate, phenoxyethyl (meth)acrylate, butoxyethyl (meth)acrylate, nonylphenoxyethyl (meth)acrylate, tetrahydrofurfuryl (meth)acrylate, glycidyl (meth)acrylate, 2-hydroxy-3-phenoxypropyl (meth)acrylate, nonylphenoxyethyltetrahydrofurfuryl (meth)acrylate, and caprolactone-modified tetrahydrofurfuryl (meth)acrylate.

Examples of polyfunctional (meth)acrylates include polyoxyalkyl ether poly(meth)acrylates such as 1,4-butanediol di(meth)acrylate, 3-methyl-1,5-pentanediol di(meth)acrylate, 1,6-hexanediol di(meth)acrylate, neopentyl glycol di(meth)acrylate, 2-methyl-1,8-octanediol di(meth)acrylate, 2-butyl-2-ethyl-1,3-propanediol di(meth)acrylate, ethylene glycol di(meth)acrylate, diethylene glycol di(meth)acrylate, dipropylene glycol di(meth)acrylate, tripropylene glycol di(meth)acrylate or polypropylene glycol di(meth)acrylate; monomers having an alicyclic structure such as norbornanedimethanol di(meth)acrylate, norbornanediethanol di(meth)acrylate, the di(meth)acrylate of a diol obtained by adding 2 mols of ethylene oxide or propylene oxide to norbornanedimethanol, tricyclodecanedimethanol di(meth)acrylate, tricyclodecanediethanol di(meth)acrylate, the di(meth)acrylate of a diol obtained by adding 2 mols of ethylene oxide or propylene oxide to tricyclodecanedimethanol, pentacyclopentadecanedimethanol di(meth)acrylate, pentacyclopentadecanediethanol di(meth)acrylate, the di(meth)acrylate of a diol obtained by adding 2 mols of ethylene oxide or propylene oxide to pentacyclopentadecanedimethanol, or the di(meth)acrylate of a diol obtained by adding 2 mols of ethylene oxide or propylene oxide to pentacyclopentadecanediethanol; trimethylolpropane tri(meth)acrylate and pentaerythritol tri(meth)acrylate; monomers having an isocyanurate structure such as bis(2-acryloyloxyethyl)hydroxyethyl isocyanurate, bis(2-acryloyloxypropyl)hydroxypropyl isocyanurate, bis(2-acryloyloxybutyl)hydroxybutyl isocyanurate, bis(2-methacryloyloxyethyl)hydroxyethyl isocyanurate, bis(2-methacryloyloxypropyl)hydroxypropyl isocyanurate, bis(2-methacryloyloxybutyl)hydroxybutyl isocyanurate, tris(2-acryloyloxyethyl) isocyanurate, tris(2-acryloyloxypropyl) isocyanurate, tris(2-acryloyloxybutyl) isocyanurate, tris(2-methacryloyloxyethyl) isocyanurate, tris(2-methacryloyloxypropyl) isocyanurate, or tris(2-methacryloyloxybutyl) isocyanurate; as well as dipentaerythritol poly(meth)acrylates, ethylene oxide-modified phosphoric acid (meth)acrylates, ethylene oxide-modified alkylphosphoric acid (meth)acrylates, diethylaminoethyl (meth)acrylate, N-vinylpyrrolidone, N-vinylcaprolactam, and vinyl ether monomers.

Furthermore, the radical polymerizable unsaturated monomers described above may be used either alone, or in combinations of two or more monomers.

In order to suppress the elastic modulus to a low value, a monofunctional monomer is preferred, and a monofunctional acrylate is particularly desirable. Moreover, methoxyethyl (meth)acrylate, phenoxyethyl (meth)acrylate, nonylphenoxyethyl (meth)acrylate and tetrahydrofurfuryl (meth)acrylate are also preferred in terms of flexibility.

Examples of oligomers that can be used in the present invention include one, or two or more radiation-curable oligomers, including urethane polyurethane (meth)acrylates such as urethane (meth)acrylates having a polyether structure, urethane (meth)acrylates having a polyester structure and urethane (meth)acrylates having a polycarbonate structure, as well as polyester (meth)acrylates obtained by esterifying a polyol having a polyester structure with (meth)acrylic acid, and polyether (meth)acrylates obtained by esterifying a polyol having a polyether structure with (meth)acrylic acid.

The proportion of monofunctional (meth)acrylates within the total quantity of ultraviolet-curable compounds contained within the ultraviolet-curable composition of the present invention is preferably from 3 to 40% by weight, and more preferably from 5 to 30% by weight. The proportion of bifunctional (meth)acrylates is preferably from 5 to 50% by weight, and more preferably from 10 to 40% by weight. Further, the proportion of trifunctional or higher (meth)acrylates is preferably not more than 20% by weight, and more preferably 10% by weight or less. The lower limit for the proportion of trifunctional or higher (meth)acrylates is preferably 5% by weight. The relative proportions of monofunctional through trifunctional (meth)acrylates may be determined appropriately in accordance with the type of (meth)acrylates being used, although by ensuring that the proportions fall within the respective ranges listed above, the viscosity of the composition during coating and the cross-linking density following curing can be set to favorable levels, a high degree of hardness can be imparted to the cured film, and warping of the cured film can be reduced.

As the photopolymerization initiator, any of the conventionally used initiators can be used, and both molecular cleavage-type initiators and hydrogen abstraction-type initiators are ideal as the photopolymerization initiator that is used in the present invention. Examples of the photopolymerization initiator used in the present invention include molecular cleavage-type initiators such as benzoin isobutyl ether, 2,4-diethylthioxanthone, 2-isopropylthioxanthone, benzil, 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one and 2-methyl-1-(4-methylthiophenyl)-2-morpholinopropan-1-one, and hydrogen abstraction-type initiators such as benzophenone, 4-phenylbenzophenone, isophthalphenone and 4-benzoyl-4'-methyl-diphenyl sulfide.

Further, examples of sensitizers that may be used include trimethylamine, methyldimethanolamine, triethanolamine, p-dimethylaminoacetophenone, ethyl p-dimethylaminobenzoate, isoamyl p-dimethylaminobenzoate, N,N-dimethylbenzylamine and 4,4'-bis(diethylamino)benzophenone, and moreover, other amines that do not undergo an addition reaction with polymerizable compounds described above may also be used in combination with the above sensitizers. Of course, these amines are preferably selected so as to have superior solubility in the ultraviolet-curable compounds and so as not to inhibit the transmission of ultraviolet radiation. Furthermore, the ultraviolet-curable resin composition may also include other additives according to need, including surfactants, leveling agents, thermal polymerization inhibitors, antioxidants such as hindered phenols and phosphites, and photostabilizers such as hindered amines.

In order to prevent corrosion of the reflection layer, a reduction in the reflectance or an increase in the error rate when the optical disc is left to stand for a long period under conditions of high temperature and high humidity, the ultraviolet-curable composition for an optical disc according to the present invention can use a compound represented by Formula (1) shown below.

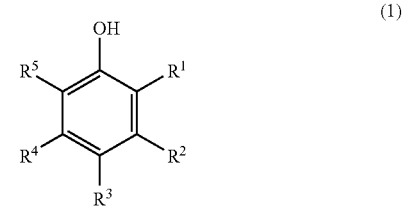

(1)

(In the formula, $R^1$, $R^2$, $R^3$, $R^4$ and $R^5$ each independently represents a hydrogen atom, a halogen atom, a hydroxyl group, an alkoxyl group of 1 to 8 carbon atoms, a carboxyl group, a group represented by Formula (2) shown below:

(2)

(In the formula, $R^6$ represents a hydrogen atom, an alkyl group of 1 to 20 carbon atoms that may be substituted with a halogen atom, or an alkenyl group of 1 to 20 carbon atoms that may be substituted with a halogen atom.), or an alkyl group or alkenyl group of 1 to 24 carbon atoms which may include a carboxyl group, alkoxycarbonyl group, acyloxy group or alkoxyl group as a substituent, provided that at least one of $R^1$, $R^2$, $R^3$, $R^4$ and $R^5$ represents a hydroxyl group.)

Compounds represented by Formula (1) include compounds having all manner of structures, but of these, gallic acid or a gallate ester represented by Formula (3) shown below is preferred.

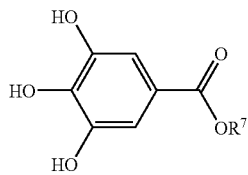

(3)

(In the formula, $R^7$ represents a hydrogen atom, an alkyl group of 1 to 20 carbon atoms that may be substituted with a halogen atom, or an alkenyl group of 1 to 20 carbon atoms that may be substituted with a halogen atom.)

The alkyl group or alkenyl group mentioned above may be either branched or linear, and the above halogen atom is preferably a fluorine atom, chlorine atom, bromine atom or iodine atom.

$R^7$ is preferably either a hydrogen atom or an alkyl group of 1 to 20 carbon atoms that may have an unsubstituted branch chain, and is more preferably either a hydrogen atom or an alkyl group of 1 to 8 carbon atoms that may have an unsubstituted branch chain. A hydrogen atom or an unsubstituted alkyl group of 1 to 4 carbon atoms is particularly desirable.

Specific examples of gallate esters include methyl gallate, ethyl gallate, propyl gallate, isopropyl gallate, isopentyl gallate, octyl gallate, dodecyl gallate, tetradecyl gallate, hexadecyl gallate and octadecyl gallate. As the compound represented by Formula (3), the use of gallic acid is preferred. Gallic acid is readily available as a commercial product, for example from Dainippon Pharmaceutical Co., Ltd.

Further, as the compound represented by Formula (1), compounds represented by Formula (4) shown below are also preferred.

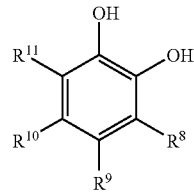

(4)

(In the formula, $R^8$, $R^9$, $R^{10}$ and $R^{11}$ each independently represents a hydrogen atom, a halogen atom, an alkoxyl group of 1 to 8 carbon atoms, an alkyl group of 1 to 24 carbon atoms that may have a —COOH, —COOR$^{12}$, —OCOR$^{13}$ or —OR$^{14}$ group as a substituent, or an alkenyl group of 1 to 24 carbon atoms that may have a —COOH, —COOR$^{12}$, —OCOR$^{13}$ or —OR$^{14}$ group as a substituent (In the formula, $R^{12}$, $R^{13}$ and $R^{14}$ each independently represents an alkyl group of 1 to 8 carbon atoms or an alkenyl group of 1 to 8 carbon atoms.).)

In Formula (4), specific examples of $R^8$, $R^9$, $R^{10}$ and $R^{11}$ include (i) a hydrogen atom, (ii) a halogen atom such as a fluorine atom, chlorine atom, bromine atom or iodine atom, (iii) an alkoxyl group such as a methoxy, ethoxy, butoxy or octyloxy group, (iv) an alkyl group such as a methyl, butyl, hexyl, octyl, lauryl or octadecyl group, (v) an alkenyl group such as an ethenyl, propenyl or 2-butenyl group, and (vi) other substituents such as a 4-carboxybutyl, 2-methoxycarbonyl-ethyl, methoxymethyl or ethoxymethyl group.

Of the compounds represented by Formula (4), preferred compounds include catechol, 3-sec-butylcatechol, 3-tert-butylcatechol, 4-sec-butylcatechol, 4-tert-butylcatechol, 3,5-di-tert-butylcatechol, 3-sec-butyl-4-tert-butylcatechol, 3-tert-butyl-5-sec-butylcatechol, 4-octylcatechol and 4-stearylcatechol, and of these, catechol and 4-tert-butylcatechol are more preferred. The use of 4-tert-butylcatechol is particularly desirable. An example of a commercially available 4-tert-butylcatechol product is DIC TBC-5P, manufactured by DIC Corporation.

Moreover, as the compound represented by Formula (1), compounds represented by Formula (5) and Formula (6) shown below are also preferred.

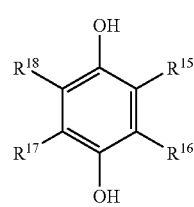

(5)

(In the formula, $R^{15}$, $R^{16}$, $R^{17}$ and $R^{18}$ each independently represents a hydrogen atom, a halogen atom, an alkoxyl group of 1 to 8 carbon atoms, an alkyl group of 1 to 24 carbon atoms that may have a —COOH, —COOR$^{12}$, —OCOR$^{13}$ or —OR$^{14}$ group as a substituent, or an alkenyl group of 1 to 24 carbon atoms that may have a —COOH, —COOR$^{12}$, —OCOR$^{13}$ or —OR$^{14}$ group as a substituent (In the formula, $R^{12}$, $R^{13}$ and $R^{14}$ each independently represents an alkyl group of 1 to 8 carbon atoms or an alkenyl group of 1 to 8 carbon atoms.)

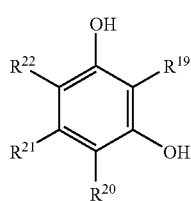

(6)

(In the formula, $R^{19}$, $R^{20}$, $R^{21}$ and $R^{22}$ each independently represents a hydrogen atom, a halogen atom, an alkoxyl group of 1 to 8 carbon atoms, an alkyl group of 1 to 24 carbon atoms that may have a —COOH, —COOR$^{12}$, —OCOR$^{13}$ or —OR$^{14}$ group as a substituent, or an alkenyl group of 1 to 24 carbon atoms that may have a —COOH, —COOR$^{12}$, —OCOR$^{13}$ or —OR$^{14}$ group as a substituent (In the formula, $R^{12}$, $R^{13}$ and $R^{14}$ each independently represents an alkyl group of 1 to 8 carbon atoms or an alkenyl group of 1 to 8 carbon atoms.)

Specific examples of $R^{15}$, $R^{16}$, $R^{17}$ and $R^{18}$ in Formula (5), and $R^{18}$, $R^{19}$, $R^{20}$ and $R^{22}$ in Formula (6) include a hydrogen atom, or a methyl group, propyl group, hexyl group, nonyl group, dodecyl group, iso-butyl group, sec-butyl group, tert-butyl group, neopentyl group, iso-hexyl group or tert-octyl group.

Of the compounds represented by Formula (5), preferred compounds include hydroquinone, 2-hydroxyhydroquinone, 2,5-di-tert-butylhydroquinone, 2,5-bis(1,1,3,3-tetramethylbutyl)hydroquinone and 2,5-bis(1,1-dimethylbutyl)hydroquinone. Further, of the compounds represented by Formula (6), preferred compounds include resorcinol (benzene-1,3-diol) and orcinol (5-methylbenzene-1,3-diol). Of these, compounds represented by Formula (5) are preferred to compounds represented by Formula (6), and of the compounds represented by Formula (5), the use of hydroquinone (benzene-1,4-diol) or 2-hydroxyhydroquinone (benzene-1,2,4-triol) is particularly preferred. Furthermore, another compound that may be used favorably in the present invention as a compound represented by Formula (1) is pyrogallol (1,2,3-trihydroxybenzene).

Of the compounds represented by Formula (3) through Formula (6), gallic acid or gallate esters represented by Formula (3) and hydroquinone-based compounds represented by Formula (5) yield a particularly large improvement in durability under conditions of high temperature and high humidity, and are therefore particularly preferred among the compounds represented by Formula (1). Furthermore, of the compounds represented by Formula (3) and Formula (5), gallic acid is the most preferred.

The quantity of the compound represented by Formula (1) added to the ultraviolet-curable composition, relative to the total weight of the ultraviolet-curable composition, is preferably within a range from 0.05 to 10% by weight, and more preferably from 0.1 to 10% by weight. A quantity from 0.3 to 7% by weight is still more preferable, and a quantity from 1 to 5% by weight is the most desirable.

A cured film obtained from an ultraviolet-curable composition that includes a compound represented by Formula (1) has the effect that even when an optical disc that uses either silver or an alloy containing silver as the main component as a reflection layer is exposed to interior lighting such as fluorescent lights, for example, a light source with a central wavelength band of 500 to 650 nm, increases in the error rate or decreases in the reflectance can be prevented.

An optical disc of the present invention is an optical disc in which at least a light reflection layer and a light transmission layer are formed on a substrate, and recording and reading are performed by a laser beam through the light transmission layer. Examples of this type of optical disc include Blu-ray discs and HD-DVD (High-Definition Digital Versatile Disc), but the present invention is particularly applicable to Blu-ray discs. In the optical disc of the present invention, by using the ultraviolet-curable composition for an optical disc described above as the light transmission layer, the disc is resistant to warping even under conditions of high temperature and high humidity, and even if silver or a silver alloy is used as the reflection layer, superior levels of durability and light fastness can be achieved, meaning recording and reading of information can be conducted favorably.

The light transmission layer in the optical disc of the present invention is a layer that efficiently transmits blue laser light, namely, laser light having an emission wavelength within a range from 370 to 430 nm, and at a thickness of 100 Mm, the transmittance of light of 405 nm is preferably not less than 85%, and more preferably 90% or greater.

The thickness of the light transmission layer is within a range from 50 to 150 Mm, and is preferably from 75 to 150 Mm. The thickness of the light transmission layer is usually set to approximately 100 Mm, but because the thickness has a large effect on the light transmittance and the reading and recording of signals, the thickness must be carefully controlled. The light transmission layer may be formed as a single cured layer of the above thickness, or a plurality of layers may be created together.

As the light reflection layer, any layer that reflects laser light and is capable of forming an optical disc that can read and record information may be used, and examples of materials that can be used include metals such as gold, silver, copper or aluminum, alloys of these metals, or inorganic compounds such as silicon. Of the various possibilities, the use of silver or an alloy containing silver as the main component is preferred, as such a material yields a higher reflectance for light having a wavelength in the vicinity of 400 nm. The thickness of the light reflection layer is preferably approximately 10 to 60 nm.

A disc-shaped circular resin substrate can be used as the substrate, and the use of a polycarbonate as the resin is particularly preferred. In those cases where the optical disc is read-only, pits that perform the role of information recording are formed within the surface of the substrate to which the light reflection layer is created.

Furthermore, in the case of a writable optical disc, an information recording layer is provided between the light reflection layer and the light transmission layer. As this information recording layer, any layer that enables the recording and reading of information can be used, and any one of a phase change recording layer, magneto-optical recording layer or organic dye recording layer may be used.

When the information recording layer is a phase change recording layer, the information recording layer is usually composed of a dielectric layer and a phase change film. The dielectric layer has a function of buffering the heat generated in the phase change layer and a function of regulating the reflectance of the disc, and typically uses a mixed composition containing ZnS and $SiO_2$. The phase change film generates a difference in reflectance by changing the phase of the film between an amorphous state and a crystalline state, and can use a Ge—Sb—Te alloy, Sb—Te alloy, or Ag—In—Sb—Te alloy.

The optical disc of the present invention may include two or more information recording regions. For example, in the case of a read-only optical disc, a first light reflection layer and a first light transmission layer may be created on the substrate containing the pits, and another layer may then be created on top of the first light transmission layer, with a second light reflection layer and a second light transmission layer then formed on top of this other layer. In this case, pits may be formed in the first light transmission layer or the other layer created on top of the first light transmission layer. Furthermore, in the case of an optical disc capable of recording and reading, the disc has a structure in which an information recording layer, a light reflection layer and a light transmission layer are created on top of a substrate, but a structure having two information recording layers, in which an additional second light reflection layer, second information recording layer and second light transmission layer are formed on top of the above light transmission layer, or a structure having three or more information recording layers, in which additional layers are created in a similar manner to above, may also be used. In those cases where a plurality of layers are created, the thickness of each layer is adjusted so that the total thickness falls within the range described above.

Furthermore, in the optical disc of the present invention, making the light transmission layer the outermost surface layer simplifies the production process, and is consequently preferred. Further, because it facilitates regulation of the surface hardness, a surface coating layer is preferably provided on the surface of the light transmission layer.

The optical disc of the present invention includes both read-only discs and discs capable of recording and reading. A read-only disc can be produced by providing the pits that function as the information recording layer during injection molding of a single circular resin substrate, subsequently forming a light reflection layer on top of the information recording layer, applying the ultraviolet-curable composition for an optical disc onto the light reflection layer using a spin coating method or the like, and then curing the composition by irradiation with ultraviolet light to form a light transmission layer. Further, a disc capable of recording and reading can be produced by forming a light reflection layer on a single circular resin substrate, subsequently providing an information recording layer such as a phase change layer or a magneto-optical layer, applying the ultraviolet-curable composition for an optical disc onto the information recording layer using a spin coating method or the like, and then curing the composition by irradiation with ultraviolet light to form a light transmission layer.

When the ultraviolet-curable composition for an optical disc that has been coated onto the light reflection layer is cured by irradiation with ultraviolet light, either a continuous light irradiation system that uses a metal halide lamp or high-pressure mercury lamp or the like, or a flash irradiation system disclosed in U.S. Pat. No. 5,904,795 may be used. In terms of enabling efficient curing, the flash irradiation system is preferred.

When irradiating the ultraviolet light, the accumulated irradiation dose is preferably controlled so as to fall within a range from 0.05 to 1 J/cm$^2$. This accumulated irradiation dose is more preferably from 0.05 to 0.8 J/cm$^2$, and still more preferably from 0.05 to 0.6 J/cm$^2$. The ultraviolet-curable composition for an optical disc used in the optical disc of the present invention cures favorably even with a small accumulated irradiation dose, meaning tack does not develop at the edges or on the surface of the optical disc, and warping or strain of the optical disc can be avoided.

In the optical disc of the present invention, in order to ensure a light transmission layer with a thickness following curing of 100±10 µm, the warping before and after curing during the formation of the light transmission layer is preferably not more than 1°. Further, the change in the specular reflectance for light of 405 nm, measured from the side of the light transmission layer, before and after exposure to high temperature and high humidity conditions of 80° C. and 85% RH for 96 hours is preferably as small as possible, and is more preferably 1% or less. Furthermore, the change in the specular reflectance for light of 405 nm, measured from the side of the light transmission layer, before and after exposure to fluorescent light of 5000 lux for 7 days is preferably as small as possible, and is more preferably 3% or less.

EXAMPLES

The present invention is described in further detail below, based on a series of examples, although the present invention is in no way limited by theses examples. In the examples, unless stated otherwise, "parts" refers to "parts by weight".

Synthesis Example-1

A reaction vessel fitted with an agitator and also equipped with a reflux condenser, an air inlet tube and a thermometer was charged with 505 parts of PLACCEL FA2D (a product obtained by adding 2 mols of ∈-caprolactone to 2-hydroxyethyl acrylate, manufactured by Daicel Chemical Industries, Ltd.), 217 parts of phthalic anhydride and 0.5 parts of methoquinone, and the temperature of the resulting mixture was raised to 90° C. under constant agitation. Following reaction for 9 hours at 90° C., 276 parts of EPICLON 850 (a bisphenol A epoxy resin manufactured by DIC Corporation having an epoxy equivalent weight of 276 g/equivalent) and 2 parts of triphenylphosphine were added, and the reaction was continued for 5 hours at 95° C., yielding an epoxy acrylate resin <J-1> with an acid value of 0.8 KOHmg/g and a viscosity (25° C., Pa·s) of 132.

Synthesis Example-2

A reaction vessel fitted with an agitator and also equipped with a reflux condenser, a decanter for separating water, an air inlet tube and a thermometer was charged with 346 parts of YD-8125 (a bisphenol A epoxy resin manufactured by Tohto Kasei Co., Ltd. having an epoxy equivalent weight of 173 g/equivalent), 501.6 parts of LIGHT-ESTER HOA-MPL (a half ester of phthalic anhydride and 2-hydroxyethyl acrylate, manufactured by Kyoeisha Chemical Co., Ltd.), 0.4 parts of methoquinone and 2 parts of triphenylphosphine, and the resulting mixture was reacted for 5 hours at 98° C., yielding a semisolid epoxy acrylate resin <h-1> with an acid value of 0.9 KOHmg/g.

Synthesis Example-3

Following reaction of 289 parts of isophorone diisocyanate with a mixture containing 903 parts of a polybutadiene glycol PB G-1000 (manufactured by Nippon Soda Co., Ltd.), 0.2 parts of di-n-butyltin dilaurate and 0.7 parts of methoquinone, 151 parts of 2-hydroxyethyl acrylate was added and reacted at 70° C., yielding a urethane acrylate <h-2>.

Preparation of Ultraviolet-Curable Compositions

Each of the compositions prepared using the formulations shown below in Table 1 was heated for 3 hours at 60° C. and dissolved, yielding a series of ultraviolet-curable compositions. The numerical values for the formulations shown in Table 1 represent parts by weight.

The compounds listed in Table 1 are as follows.
J-2: CNUVE151 (manufactured by Sartomer Company, Inc., an epoxy acrylate resin obtained by reaction of a half ester compound, obtained from a lactone-adduct of hydroxyalkyl (meth)acrylate and a dibasic acid anhydride, and an epoxy resin)
EOTMPTA: ARONIX M-350 (trimethylolpropane triethoxy triacrylate, manufactured by Toagosei Co., Ltd.)
BP4EA: LIGHT-ACRYLATE BP4EA (manufactured by Kyoeisha Chemical Co., Ltd.)
DPGDA: MIRAMER M-222 (dipropylene glycol diacrylate, manufactured by Miwon Commercial Co., Ltd.)
TPGDA: tripropylene glycol diacrylate, manufactured by Miwon Commercial Co., Ltd.
TCDDA: MIRAMER M-260 (tricyclodecanedimethylol diacrylate, manufactured by Miwon Commercial Co., Ltd.)
HPNDA: hydroxypivalic acid neopentyl glycol ester diacrylate, manufactured by Dai-ichi Kogyo Seiyaku Co., Ltd.
M-313: ARONIX M-313 (isocyanuric acid EO-modified di- and triacrylate, manufactured by Toagosei Co., Ltd.)
PHE: phenoxyethyl acrylate, manufactured by Osaka Organic Chemical Industry Ltd.
THFA: tetrahydrofurfuryl acrylate, manufactured by Osaka Organic Chemical Industry Ltd.
TCA: FA-513A, tricyclodecanyl acrylate, manufactured by Hitachi Chemical Co., Ltd.
PM-2: methacryloyloxyethyl phosphate, manufactured by Nippon Kayaku Co., Ltd. Irg. 184: IRGACURE 184, manufactured by Ciba Specialty Chemicals Inc.
DBE: ethyl N-dimethylaminobenzoate
Gallic acid: 3,4,5-trihydroxybenzoic acid (the compound of Formula (3) in which the substituent $R^7$ is a hydrogen atom)
Preparation of Optical Disc Samples and Measurement of Warping Optical disc substrates with a diameter of 120 mm and a thickness of 1.1 mm, and having information-bearing pits on the surface were prepared, an alloy of silver and bismuth containing silver as the main component was sputtered with a film thickness of 20 to 40 nm onto the pitted surface of each optical disc substrate, and the warping of the optical disc substrate was then measured, yielding a measured value for the warping prior to curing. The warping was measured using an "Argus Blu" device manufactured by Dr. Schwab Inspection Technology GmbH, by conducting full surface scanning of the warping in a radial direction from a radius 24 mm from the disc center to a radius of 58 mm, and recording the average radial tilt in the region from a radius of 44 mm to a radius of 45 mm as the measured warp value. Subsequently, each of the ultraviolet-curable compositions (Examples 1 to 4 and Comparative Examples 1 to 2) was dripped onto an optical disc substrate and then spin coated so as to obtain a light transmission layer with a thickness following curing of 100±10 μm. The light transmission layer was then irradiated with ultraviolet light using a metal halide lamp fitted with a cold mirror (120 W/cm$^2$) and an irradiation dose of 500 mJ/cm$^2$ (actinometer UVPF-36, manufactured by Eyegraphics Co., Ltd.), thus making a cured optical disc sample. The radial tilt of the optical disc sample was then re-measured to obtain a measured value for the warping following curing. From the measured values for the warping before and after warping, the change in radial tilt upon curing was determined. If this change in radial tilt upon curing was not more than 1°, then an evaluation of 0 was recorded, whereas if the change exceeded 1°, an evaluation of x was recorded.

Evaluation of Optical Disc Durability and Reflectance

Using a PR-2PK device manufactured by Espec Corporation, optical disc samples prepared in the same manner as described above were exposed to high temperature and high humidity conditions of 80° C. and 85% RH for 96 hours (a durability test). For each sample, a spectrophotometer UV-3100 (manufactured by Shimadzu Corporation) was used to measure the specular reflectance at 405 nm, from the side of the light transmission layer, before and after the test. If the change in this specular reflectance upon testing was not more than 1%, then an evaluation of 0 was recorded, whereas if the change exceeded 1%, an evaluation of x was recorded.

Evaluation of Optical Disc Light Fastness (Fluorescent Light Exposure Test) and Reflectance Optical disc samples prepared in the same manner as described above were subjected to an exposure test under fluorescent lamps to evaluate the light fastness. Two 40 W fluorescent lamps (Neolumi Super FLR40SW/M (40 watt), manufactured by Mitsubishi Electric Corporation) were arranged in parallel in the same plane, each optical disc was positioned so that the light transmission layer side of the disc was facing the fluorescent lamps from a position 15 cm from the center of the lamps, and a fluorescent light exposure test was conducted at an illumination intensity of 5,000 lux. Exposure was conducted for 7 days, and the reflectance of each sample before and after the exposure was measured in the same manner as that described above. If the change in reflectance upon this testing was not more than 3%, then an evaluation of 0 was recorded, whereas if the change exceeded 3%, an evaluation of x was recorded.

Furthermore, the measurement results for the reflectance were also reported by recording the reflectance before and after each durability test in terms of the difference: reflectance before durability test–reflectance after durability test. The samples of Examples 1 to 4 exhibited small differences, and also displayed favorable results for the durability test under conditions of high temperature and high humidity.

Method of Measuring Elastic Modulus

The ultraviolet-curable composition was applied to a glass plate in sufficient quantity to generate a cured coating film of 100±10 μm, and the coating film was then cured in a nitrogen atmosphere at 500 mJ/cm$^2$ using a metal halide lamp (fitted with a cold mirror, lamp output: 120 W/cm$^2$). The elastic modulus of the cured coating film was measured using an automated dynamic viscoelasticity measurement device manufactured by TA Instruments Inc., and the dynamic elastic modulus E' at 25° C. was recorded as the elastic modulus.

The test results for the optical discs of the Examples and Comparative Examples prepared using the various compositions are shown in Table 1.

TABLE 1

|  | Example 1 | Example 2 | Example 3 | Example 4 | Comparative example 1 | Comparative example 2 |
| --- | --- | --- | --- | --- | --- | --- |
| J-1 | 48 | 48 |  |  |  |  |
| J-2 |  |  | 58.5 | 57 |  |  |
| h-1 |  |  |  |  | 48 |  |
| h-2 |  |  |  |  |  | 40 |
| EOTMPTA | 0.05 | 0.05 |  |  | 0.05 |  |
| BP4EA |  | 10 |  |  |  |  |
| DPGDA |  | 10 |  |  |  |  |

TABLE 1-continued

|  | Example 1 | Example 2 | Example 3 | Example 4 | Comparative example 1 | Comparative example 2 |
|---|---|---|---|---|---|---|
| TPGDA |  |  | 18 |  |  |  |
| TCDDA | 30 | 10 |  |  | 30 |  |
| HPNDA |  |  |  | 16 |  |  |
| M-313 |  |  |  |  |  | 20 |
| PHE | 17 | 17 | 21.5 | 25 | 17 |  |
| THFA | 3 | 3 | 0.5 | 0.5 | 3 | 25 |
| TCA |  |  |  |  |  | 15 |
| PM-2 | 0.01 | 0.05 | 0.01 | 0.01 | 0.05 |  |
| Irg. 184 | 2 | 2 | 2 | 2 | 2 | 3 |
| DBE | 0.02 | 0.02 | 0.02 | 0.02 | 0.02 |  |
| Gallic acid | 0.03 | 0.03 | 0.05 | 0.05 | 0.03 |  |
| Total | 100.1 | 100.2 | 100.6 | 100.6 | 100.2 | 103.0 |
| Viscosity mPa·s (25° C.) | 1330 | 1080 | 2010 | 2000 | 4850 | 2000 |
| E'/MPa (25° C.) | 1500 | 800 | 1500 | 1860 | 2100 | 1300 |
| Warping | | | | | | |
| Change in radial tilt (°) | 0.36 | 0.17 | 0.40 | 0.82 | 1.19 | 0.43 |
| Evaluation | ○ | ○ | ○ | ○ | x | ○ |
| Durability (reflectance) | | | | | | |
| Before testing (%) | 32.70 | 33.08 | 33.95 | 33.75 | 33.06 | 32.86 |
| After testing (%) | 32.37 | 32.64 | 33.42 | 33.15 | 32.07 | corrosion |
| Change (%) | −0.33 | −0.44 | −0.53 | −0.60 | −0.99 |  |
| Evaluation | ○ | ○ | ○ | ○ | ○ | x |
| Light fastness (fluorescent light exposure test) | | | | | | |
| Before testing (%) | 32.75 | 32.99 | 34.04 | 34.02 | 32.62 | 32.84 |
| After testing (%) | 32.15 | 31.83 | 33.63 | 33.73 | 33.89 | 29.08 |
| Change (%) | −0.60 | −1.16 | −0.41 | −0.29 | 1.27 | −3.76 |
| Evaluation | ○ | ○ | ○ | ○ | ○ | x |

As is evident from Examples 1 to 4, using the epoxy acrylate resin of Synthesis Example J-1 of the present invention enabled a satisfactorily low value to be obtained for the initial warping following curing, and the durability and light fastness were also excellent. In contrast, although Comparative Example 1 exhibited excellent durability and light fastness, because the epoxy acrylate resin of Synthesis Example h-1 was used, the elastic modulus was higher, and the warping results were inferior. Further, in the case of Comparative Example 2, it is clear that although the elastic modulus was low and the warping was favorable, the durability and light fastness results were unsatisfactory.

According to the present invention, an optical disc can be obtained that exhibits minimal warping and excellent durability and light fastness. Accordingly, an optical disc of the present invention is ideal for a blue laser optical disc having a thick light transmission layer.

The invention claimed is:

1. A method of suppressing warping in an optical disc to changes in radial tilt of below 0.82 degrees, comprising providing an optical disc consisting essentially of a light reflection layer and a light transmission layer formed on a substrate, wherein
    recording and reading are performed by a blue laser beam through the light transmission layer;
    the light transmission layer is formed from a cured film of an ultraviolet-curable composition comprising:
    an epoxy acrylate resin obtained by reacting a half ester compound (A), which is obtained from a lactone-adduct of a hydroxyalkyl (meth)acrylate (a1) and a dibasic acid anhydride (a2), and an epoxy resin (B), and
    a compound represented by Formula (3):

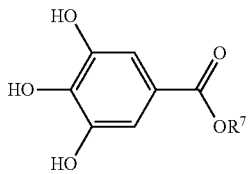

where $R^7$ represents a hydrogen atom, an alkyl group of 1 to 20 carbon atoms that may be substituted with a halogen atom, or an alkenyl group of 1 to 20 carbon atoms that may be substituted with a halogen atom, wherein the epoxy acrylate resin is 20% to 70% by weight relative to the total weight of the ultraviolet-curable composition; and
    a film thickness of the light transmission layer is from 50 to 150 μm.

2. The method according to claim 1, wherein said light reflection layer is formed of silver or an alloy comprising silver as a main component.

3. The method according to claim 1, wherein said lactone-adduct of a hydroxyalkyl (meth)acrylate (a1) is a compound obtained by adding 2 to 10 mols of ∈-caprolactone to 1 mol of 2-hydroxyethyl acrylate.

4. The method according to claim 1, wherein a weight average molecular weight (Mw) of said epoxy acrylate resin is from 900 to 8,000, and a ratio between said weight average molecular weight (Mw) and a number average molecular weight (Mn) (namely, Mw/Mn) is from 1.3 to 2.8.

5. The method according to claim 1, wherein the quantity of the compound represented by Formula (3) is 0.03% by weight relative to the total weight of the ultraviolet-curable composition.

6. The method according to claim 1, wherein the quantity of the compound represented by Formula (3) is 0.05% by weight relative to the total weight of the ultraviolet-curable composition.

7. The method according to claim 1, wherein the film thickness of the light transmission layer is approximately 100 μm.

8. The method according to claim 1, wherein the film thickness of the light transmission layer is approximately 100±10 μm.

9. The method according to claim 1, wherein the film thickness of the light transmission layer is from 75 to 150 μm.

10. The method according to claim 1, wherein $R^7$ represents a hydrogen atom in the compound represented by Formula (3).

11. The method according to claim 1, wherein $R^7$ represents a hydrogen atom in the compound represented by Formula (3).

12. The method according to claim 1, wherein the optical disc consists of only a light reflection layer and a light transmission layer formed on a substrate.

13. The method according to claim 1, wherein the optical disc consists of only a light reflection layer, an information recording layer, and a light transmission layer formed on a substrate.

14. The method according to claim 1, wherein the epoxy acrylate resin in the light transmission layer is present in an amount of 48% to 58.5% by weight relative to the total weight of the ultraviolet-curable composition.

* * * * *